United States Patent
Shi

(10) Patent No.: US 10,867,552 B2
(45) Date of Patent: Dec. 15, 2020

(54) BACKLIGHT SOURCE AND METHOD FOR CONTROLLING LIGHT OUTPUT DIRECTION THEREOF, DISPLAY PANEL AND DISPLAY DEVICE

(71) Applicants: HEFEI BOE DISPLAY LIGHTING CO., LTD., Anhui (CN); BOE TECHNOLOGY GROUP CO., LTD., Beijing (CN)

(72) Inventor: Zuchuan Shi, Beijing (CN)

(73) Assignees: HEFEI BOE DISPLAY LIGHTING CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/394,734

(22) Filed: Apr. 25, 2019

(65) Prior Publication Data

US 2020/0105188 A1 Apr. 2, 2020

(30) Foreign Application Priority Data

Sep. 30, 2018 (CN) .......................... 2018 1 1159335

(51) Int. Cl.
*G02F 1/13357* (2006.01)
*G09G 3/3208* (2016.01)
*G02B 27/09* (2006.01)

(52) U.S. Cl.
CPC ....... *G09G 3/3208* (2013.01); *G02B 27/0955* (2013.01); *G02F 1/133606* (2013.01)

(58) Field of Classification Search
CPC .............. G09G 3/3208; G02B 27/0955; G02F 1/133602; G02F 1/133603; G02F 1/133604; G02F 1/133605; G02F 1/133606; G02F 1/133608; G02F 1/133611
See application file for complete search history.

(56) References Cited

U.S. PATENT DOCUMENTS

| | | | |
|---|---|---|---|
| 2009/0168041 A1* | 7/2009 | Sawai | G02B 27/0994 355/71 |
| 2009/0213147 A1* | 8/2009 | Sagardoyburu | G09G 3/3208 345/690 |
| 2018/0196310 A1* | 7/2018 | Ma | G02B 6/0066 |

* cited by examiner

*Primary Examiner* — Alexander Eisen
*Assistant Examiner* — Cory A Almeida
(74) *Attorney, Agent, or Firm* — Nath, Goldberg & Meyer; Joshua B. Goldberg

(57) ABSTRACT

A backlight source, and a method for controlling a light output direction thereof, a display panel, and a display device are provided, the backlight source includes: a back plate; at least one light source, which is disposed on a surface of the back plate; and a light direction transformation part, which is configured to be movable along the back plate, such that the at least one light source is changed from directly facing a first portion of the light direction transformation part having a first light direction transformation mode to directly facing a second portion of the light direction transformation part having a second light direction transformation mode.

16 Claims, 3 Drawing Sheets

BACKLIGHT SOURCE AND METHOD FOR CONTROLLING LIGHT OUTPUT DIRECTION THEREOF, DISPLAY PANEL AND DISPLAY DEVICE

CROSS-REFERENCE TO RELATED APPLICATIONS

The present application claims the priority of Chinese Patent Application No. 201811159335.2, titled "A BACKLIGHT SOURCE, DISPLAY PANEL AND DISPLAY DEVICE", filed at the China Intellectual Property Office on Sep. 30, 2018, the disclosed contents of which are incorporated herein in their entirety by reference.

TECHNICAL FIELD

The present disclosure relates to the field of display technology, and in particular, relates to a backlight source, a display panel, a display device and a method for controlling light output direction of the backlight source.

BACKGROUND

A display requires different viewing angles in different application scenarios, for example, it requires a wide viewing angle when viewed by many people, a narrow viewing angle in a peep proof circumstance, and a particular viewing angle in some cases, which requires that the display has a function of switching between viewing angles.

SUMMARY

According to an embodiment of the present disclosure, there is provided a backlight source, including: a back plate; at least one light source, which is disposed on a surface of the back plate; and a light direction transformation part, which is attached to the back plate, and is located at a light output side of the at least one light source, wherein the light direction transformation part is configured to be movable along the back plate, such that the at least one light source is changed from directly facing a first portion of the light direction transformation part having a first light direction transformation mode to directly facing a second portion of the light direction transformation part having a second light direction transformation mode, and the first light direction transformation mode is different from the second light direction transformation mode.

According to an embodiment of the present disclosure, the light direction transformation part includes a transparent base and at least one optical unit disposed on a surface of the transparent base distal to the at least one light source.

According to an embodiment of the present disclosure, the at least one optical unit includes a plurality of optical units arranged in an array, and the at least one light source includes a plurality of light sources arranged in an array.

According to an embodiment of the present disclosure, the plurality of light sources are arranged to be in one-to-one correspondence with the plurality of optical units.

According to an embodiment of the present disclosure, the number of the plurality of light sources is greater than the number of the plurality of optical units, and multiple light sources correspond to one optical unit.

According to an embodiment of the present disclosure, each of the plurality of optical units includes at least two optical elements, the at least two optical elements have different light direction transformation modes, and wherein the light direction transformation part moves along the back plate, to change one of the at least one light source from directly facing one of the at least two optical elements to directly facing another one of the at least two optical elements.

According to an embodiment of the present disclosure, each of the plurality of optical units includes a same number of optical elements, and those optical elements disposed at a same position of respective ones of the optical units have a same light direction transformation mode.

According to an embodiment of the present disclosure, each of the plurality of optical units includes four optical elements, and the four optical elements are arranged in a 2×2 array.

According to an embodiment of the present disclosure, the backlight source further includes a driving mechanism, which is fixed onto the back plate, and is configured to drive the light direction transformation part to move along the back plate.

According to an embodiment of the present disclosure, the driving mechanism includes a mechanical telescopic rod, a first end of the mechanical telescopic rod is fixed onto the transparent base, and a second end of the mechanical telescopic rod is fixed onto the back plate.

According to an embodiment of the present disclosure, the driving mechanism further includes a driver provided on the back plate, and the driver is connected to the second end of the mechanical telescopic rod, and is configured to drive the mechanical telescopic rod to move telescopically in a desired direction.

According to an embodiment of the present disclosure, the light direction transformation mode is selected from a group consisting of a mode for causing light convergence, a mode for causing light divergence, and a mode for causing light to travel in a specified direction.

According to an embodiment of the present disclosure, the optical element is selected from a group consisting of a light converging device, a light diverging device, and a device for causing light to travel along a specified direction.

According to an embodiment of the present disclosure, the light converging device includes a convex lens, the light diverging device includes a concave lens, and the device for causing light to travel along a specified direction includes a compound-eye lens.

According to an embodiment of the present disclosure, the backlight source is a direct illumination type backlight source, and the at least one light source includes an organic light emitting diode.

According to an embodiment of the present disclosure, the backlight source further includes a diffusion plate, which is disposed at a side of the light direction transformation part distal to the at least one light source.

According to an embodiment of the present disclosure, there is provided a display panel, including the backlight source described above.

According to an embodiment of the present disclosure, there is provided a display device, including the display panel described above.

According to an embodiment of the present disclosure, there is provided a method for controlling a light output direction of a backlight source, wherein the backlight source includes: a back plate: at least one light source, which is disposed on a surface of the back plate: and a light direction transformation part, which is attached to the back plate, and is located at a light output side of the at least one light source, the light direction transformation part is movably attached to the back plate, the method includes: driving the light direction transformation part to move along the back plate, to change the at least one light source from directly facing a first portion of the light direction transformation part having a first light direction transformation mode to directly facing a second portion of the light direction transformation part having a second light direction transformation mode.

According to an embodiment of the present disclosure, each of the first light direction transformation mode and the second light direction transformation mode is one of a mode for causing light convergence, a mode for causing light divergence, and a mode for causing light to travel along a specified direction, and the first light direction transformation mode is different from the second light direction transformation mode.

DETAILED DESCRIPTION

In order for those skilled in the art to better understand technical solutions of the present disclosure, a backlight source and a method for controlling a light output direction thereof, a display panel and a display device provided by the present disclosure will be described in further detail below in conjunction with the accompanying drawings and specific implementations.

Currently, a display has a fixed viewing angle, and freely changing the viewing angle cannot be realized, Therefore, how to achieve free switching of a viewing angle of a display has become an urgent problem to be solved.

Figure 1:
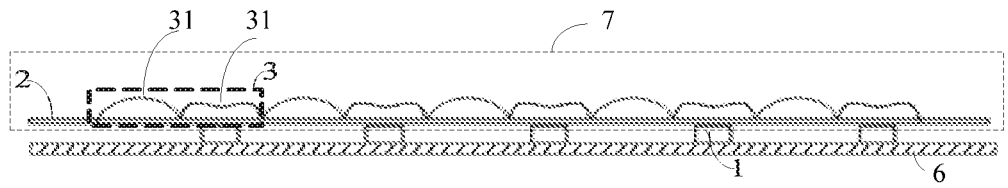
FIG. 1 is a sectional view of a structure of a backlight source according to an embodiment of the present disclosure.

According to an embodiment of the present disclosure, there is provided a backlight source, as shown in FIG. 1, which includes: a back plate 6; at least one light source 1, which is disposed on the back plate 6; and a light direction transformation part 7, which is attached to the back plate 6, and is located at a light output side of the at least one light source 1. The light direction transformation part 7 is configured to be movable along the back plate 6, such that a state where a portion of the light direction transformation part 7 having a light direction transformation mode directly faces the at least one light source 1 is changed into a state where a portion of the light direction transformation part 7 having another light direction transformation mode directly faces the at least one light source 1. Different light direction transformation modes may change the propagation direction of light emitted by the at least one light source 1 differently.

FIG. 1 illustrates a direct illumination type backlight source, that is, the light source 1 is placed directly under a light output surface of the backlight source. The light direction transformation part 7 can change the propagation direction of light emitted by the light source 1 at different light direction transformation modes, so that change of backlight direction (light outgoing direction) of the backlight source is realized at different modes, which in turn enables a display device employing the backlight source to realize switching between at least two display viewing angles, to meet the demands of viewers under different scenarios.

According to an embodiment of the present disclosure, as shown in FIG. 1, the light direction transformation part 7 includes a transparent base 2 and at least one optical unit 3 disposed on a surface of the transparent base 2 distal to the at least one light source 1. The optical unit 3 can change the propagation direction of light emitted by the light source 1 corresponding thereto.

Figure 2:
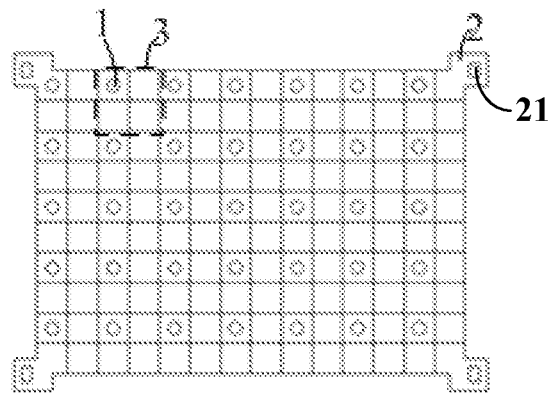
FIG. 2 is a plan view of a partial structure of the backlight source according to an embodiment of the present disclosure.

According to an embodiment of the present disclosure, as shown in FIG. 2, the at least one optical unit 3 includes a plurality of optical units 3 arranged in an array, and the at least one light source 1 includes a plurality of light sources 1 arranged in an array.

According to an embodiment of the present disclosure, the plurality of optical units 3 are arranged to be in one-to-one correspondence with the plurality of light sources 1, respectively. Such an arrangement can cause each of the optical units 3 to change propagation direction of light emitted by a respective light source 1 corresponding thereto, thereby realizing change of backlight direction of the backlight source.

According to an embodiment of the present disclosure, as shown in FIG. 1, each of the plurality of optical units 3 includes at least two optical elements 31, which have different light direction transformation modes (that is, the at least two optical elements 31 can cause the light emitted from the at least one light source to travel in different manners, respectively), and when the light direction transformation part 7 moves along the back plate 6, one of the at least one light source 1 is changed from directly facing one of the at least two optical elements 31 to directly facing another one of the at least two optical elements 31. That is, moving the light direction transformation part 7 can cause either one of the optical elements 31 of the optical unit 3 to directly face the light source 1 corresponding to the optical unit 3. Since the optical elements 31 of each optical unit 3 have different light direction transformation modes, the different light direction transformation modes can cause the light emitted by the light source 1 to have different propagation directions. As such, by changing which optical element 31 directly facing the light source 1, the backlight direction of the backlight source can be changed, which in turn enables a display device employing the backlight source to realize switching between at least two display viewing angles, to meet the demands of viewers under different scenarios.

Figure 3:
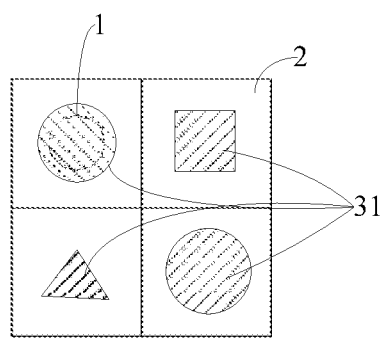
FIG. 3 is a plan view of a structure of one optical unit and a light source corresponding thereto according to an embodiment of the present disclosure.
Figure 4:
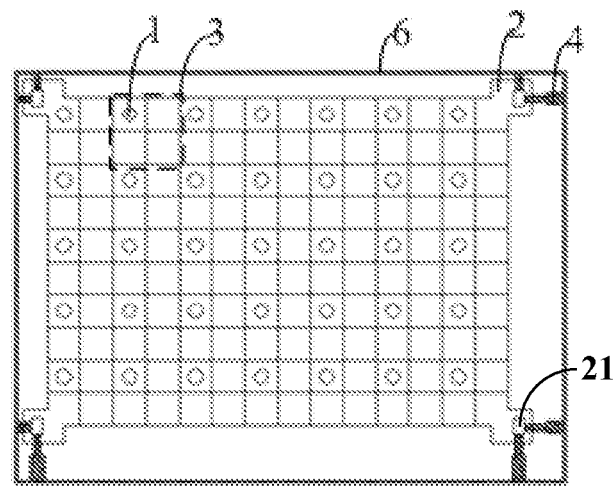
FIG. 4 is a plan view of an overall structure of the backlight source according to an embodiment of the present disclosure.

According to an embodiment of the present disclosure, each of the plurality of optical units 3 includes a same number of optical elements 31, and those ones of optical elements 31 disposed at a same position of respective ones of the optical units 3 have a same light direction transformation mode. When the optical units 3 and the light sources 1 are arranged in arrays as shown in FIGS. 2 and 4, for example, in the arrangement of the optical elements 31 in one optical unit 3 shown in FIG. 3, each of the optical units 3 includes four, that is, a circular 1 (upper left), a rectangular, a triangular, and a circular 2 (lower right) optical elements 31, and each of these four optical elements 31 is located at a same position of respective ones of the optical units 3.

Because there are the same number of optical elements 31 in each of the optical units 3, and same positions of respective ones of the optical units 3 are occupied by optical elements 31 having the same light direction transformation mode, when the light direction transformation part 7 is moved to a certain position, it can cause optical elements 31 in different optical units 3 having the same light direction transformation mode to directly face the light sources 1 corresponding to respective ones of the optical units 3, so that the optical elements 31 having the same light direction transformation mode in the light direction transformation part 7 operate at the same time.

According to an embodiment of the present disclosure, each of the plurality of optical units 3 includes four optical elements, and the four optical elements are arranged in a 2×2 array. As shown in FIG. 3, this optical unit 3 includes four different optical elements 31, and these four optical elements 31 are arranged in two rows and two columns. By moving the light direction transformation part 7, one of the four optical elements 31 is caused to directly face the light source 1, then the propagation direction of light emitted by the light source 1 can be changed according to a light direction transformation mode of this directly facing optical element 31. In this case, the optical element 31 directly facing the light source 1 changes the propagation direction of light emitted by the light source 1, and any optical element 31 not directly facing the light source 1 does not change the propagation direction of light emitted by the light source 1.

According to an embodiment of the present disclosure, the light direction transformation part 7 further includes a driving mechanism 4, which is fixed onto the back plate 6, and is configured to drive the light direction transformation part 7 to move along the back plate 6. As shown in FIG. 4, the driving mechanism 4 is fixed onto the back plate 6, and each of four corners of the rectangular back plate 6 is provided with a driving mechanism 4. Accordingly, at each of the four corners of the base 2 there is provided a hole 21, and the driving mechanism 4 is fixedly connected with the base 2 through holes 21 at the four corners of the base 2, so that when the driving mechanism 4 moves, it can drive the base 2 to move, and thus any one of different optical elements 31 can directly face the light source 1 corresponding thereto. Providing the driving mechanism 4 can cause optical elements 31 of a same light direction transformation mode in the light direction transformation part 7 to operate at the same time, so as to make the propagation direction of light emitted by all the light sources 1 to change in a same manner in the same light direction transformation mode.

Figure 5:
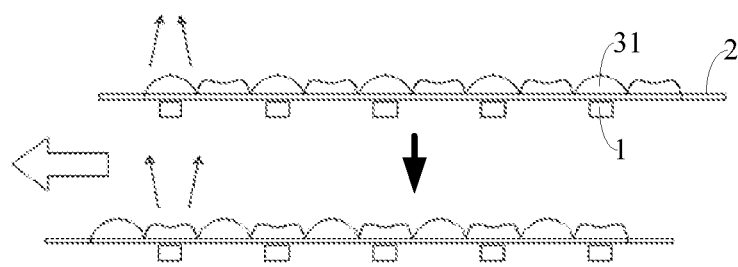
FIG. 5 is a schematic view showing movement of a light direction transformation part when switching between light direction transformation modes according to an embodiment of the present disclosure.
Figure 6:
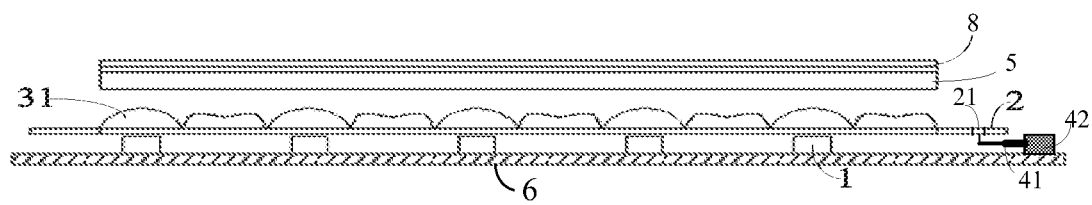
FIG. 6 is a sectional view of a structure of a backlight source provided with a diffusion plate according to an embodiment of the present disclosure.

According to an embodiment of the present disclosure, the driving mechanism 4 includes a mechanical telescopic rod, a first end of which is fixed onto the base 2, and a second end of which is fixed onto the back plate 6. As shown in FIG. 6, the driving mechanism 4 includes a mechanical telescopic rod 41, a second end of the mechanical telescopic rod 41 is (directly or indirectly) fixed onto the back plate 6 of the backlight source, and a first end thereof is fixed onto the base 2 via the hole 21. As shown in FIG. 4, for the four holes 21 located at the four corners of the base 2, each of the holes 21 is connected to at least two mechanical telescopic rods 41, to enable the base 2 to move along four directions, i.e. forward, backward, left, and right, in a plane parallel to the back plate 6. As shown in FIG. 5, by moving the base 2 along the direction of the arrow pointing to the left in FIG. 5, one can change the optical element 31 through which light emitted by the light source 1 transmits, to cause the light transmitting through the optical element 31 to transform from converging to diverging.

According to an embodiment of the present disclosure, the driving mechanism 4 further includes a driver 42 provided on the back plate 6, the driver 42 is connected to the second end of the mechanical telescopic rod 41, and is configured to drive the mechanical telescopic rod 41 to move telescopically in a desired direction. The mechanical telescopic rod 41, driven by electric power supplied by the driver 42, is capable of doing telescopic motion along four, that is, forward, backward, left, and right, directions in the plane parallel to the back plate 6, thereby driving the base 2 to move along the four i.e. forward, backward, left, and right directions, so that any optical element 31 in one optical unit 3 can directly face the light source 1 corresponding to that optical unit 3, to switch and change the propagation direction of light emitted by the light source 1 in a corresponding mode. The driving mechanism 4 can enhance efficiency at which the propagation direction of light emitted by the light source 1 is switched and changed. Obviously, the present disclosure is not limited hereto, and the present disclosure may also employ a driving mechanism having other structures.

According to an embodiment of the present disclosure, the light direction transformation modes may include a mode for causing light convergence, a mode for causing light divergence, and a mode for causing light to travel in a specified direction. According to an embodiment of the present disclosure, optical elements 31 in each of the plurality of optical units 3 may include a light converging device, a light diverging device, and a device for causing light to travel along a specified direction, which may be used to realize light convergence, light divergence, and light travelling along a specified direction, respectively.

Under the drive of the driving mechanism 4, by causing the light source 1 to directly face the light converging device in each of the optical units 3, light emitted by the light source 1 can be converged, so as to realize narrow-viewing-angle display of a display device employing the backlight source. By causing the light source 1 to directly face the light diverging device in each of the optical units 3, light emitted by the light source 1 can be diverged, so as to realize wide-viewing-angle display of a display device employing the backlight source. By causing the light source 1 to directly face the device for causing light to travel along a specified direction in each of the optical units 3, light emitted by the light source 1 can propagate along the specified direction, so that the backlight source outputs light at a particular angle, so as to realize particular-viewing-angle display of a display device employing the backlight source. The above arrangement makes it possible that the backlight direction of the backlight source can be changed in at least two modes, which in turn enables a display device employing the backlight source to realize switching between at least two display viewing angles, to meet the demands of viewers under different scenarios.

It is to be noted that different optical elements 31 may also be light converging devices with different focal lengths, so as to realize different degrees of convergence of light emitted by the light source 1, and to enable the backlight of the backlight source to switch between at least two different degrees of convergence. Similarly, different optical elements 31 may also be light diverging devices with different focal lengths, so as to realize different degrees of divergence of light emitted by the light source 1, and to enable the backlight of the backlight source to switch between at least two different degrees of divergence. Different optical elements 31 may also be devices for causing light to travel along specified directions, which cause light to propagate along different specified directions, respectively, so as to realize adjusting the propagation direction of light emitted by the light source 1 to a particular direction, and to enable the backlight direction of the backlight source to switch between at least two different directions.

According to an embodiment of the present disclosure, the light converging device may include a convex lens, the light diverging device may include a concave lens, and the device for causing light to travel along a specified direction may include a compound-eye lens. It is obvious that the light converging device may also employ any other light-transmitting device having a light converging function. The light diverging device may also employ any other light-transmitting device having a light diverging function. The device for causing light to travel along a specified direction may also employ any other device that causes light to propagate along a specified direction.

According to an embodiment of the present disclosure, the base 2 may employ a PC (Polycarbonate), PET (polyethylene glycol terephthalate), or PMMA (polymethyl methacrylate) material. Since the base 2 made of these materials has a high transmittance, basically the light direction transformation part 7 would not affect utilization rate of light emitted by the light source 1.

According to an embodiment of the present disclosure, the light source 1 may include LED (Light Emitting Diode). According to an embodiment of the present disclosure, the LED may be a mini LED (that is, submillimeter LED), which is a LED having a size of about 100 micrometers. LED has a high brightness, and can effectively reduce a light mixing height of the backlight source, thereby achieving thinning of the backlight source.

According to an embodiment of the present disclosure, as shown in FIG. 6, the backlight source may also include a diffusion plate 5, which is disposed at a side of the light direction transformation part 7 distal to the at least one light source 1. This diffusion plate may serve as a division plate, and may employ a transparent PET plate. The diffusion plate 5 can uniformly mix light emitted from the light source 1, to enhance uniformity of light. In addition, the backlight source may also include a diffusion film 8 such as a brightness enhancement film, the diffusion film 8 is disposed on a surface of the diffusion plate 5 distal to the light direction transformation part 7, and is arranged in conventional manner and position, which is not described in further detail herein.

It is to be noted that, in the present disclosure, there may be just one light source 1, and multiple optical units 3. According to switching requirements of light output direction of the light source 1, the multiple optical units 3 can correspond to the one light source 1, respectively.

In the present disclosure, there also may be multiple light sources 1 and multiple optical units 3, and the number of the optical units 3 is greater than the number of the light sources 1. For example, optical units 3 in the light direction transformation part 7 may be divided into two sections, that is, a first section and a second section, optical elements 31 of optical units in the first section of optical units 3 are different from optical elements 31 of optical units in the second section of optical units 3, and different optical elements 31 correspond to different light direction transformation modes. According to an embodiment of the present disclosure, these two sections of optical units may be provided at different positions on a surface of the transparent base 2, for example, all optical units in the first section of optical units 3 may be provided in one continuous half area on the transparent base 2, and all optical units in the second section of optical units 3 may be provided in the other continuous half area on the transparent base 2; alternatively, optical units in the first section of optical units 3 and optical units in the second section of optical units 3 are alternately arranged on the transparent base 2. According to switching requirements of light output direction of the light source 1, the first section of optical units 3 are in one-to-one correspondence with the light sources 1, and the propagation directions of light emitted by the light sources 1 are changed according to light direction transformation modes corresponding to optical elements 31 in the first section of optical units 3. If the light direction transformation part 7 is moved, such that the second section of optical units 3 are in one-to-one correspondence with the light sources 1, then the propagation directions of light emitted by the light sources 1 can be changed according to light direction transformation modes corresponding to optical elements 31 in the second section of optical units 3. Since the optical elements 31 in the first section of optical units 3 are different from the optical elements 31 in the second section of optical units 3, it is possible to realize changing the light output direction of the light sources 1 in more various manners. According to an embodiment of the present disclosure, the first section of optical units 3 may be provided first in one-to-one correspondence with the light sources 1, and while keeping the first section of optical units 3 in one-to-one correspondence with the light sources 1, the second section of optical units 3 may be provided in one-to-one correspondence with the light sources 1, that is, the second section of optical units 3 overlaps the first section of optical units 3 in a direction perpendicular to the transparent base 2, such that light emitted by the light source 1 transmits through two optical units 3, to change the propagation direction of light emitted by the light source 1 using a combination of the two light direction transformation modes. As such, since the optical elements 31 in the first section of optical units 3 are different from the optical elements 31 in the second section of optical units 3, it is also possible to realize changing the light output direction of the light sources 1 in more various manners.

Figure 8:
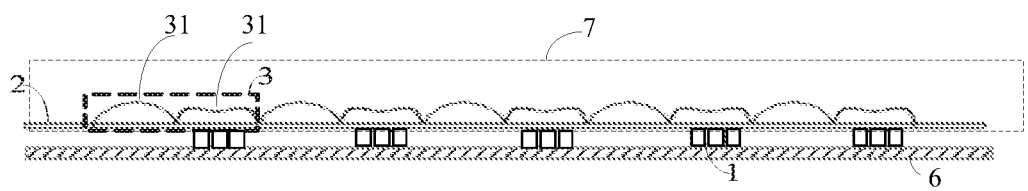
FIG. 8 is a sectional view of a structure of a backlight source according to another embodiment of the present disclosure.

In the present disclosure, there may also be multiple light sources 1 and multiple optical units 3, and the number of the optical units 3 is smaller than the number of the light sources 1, multiple light sources 1 may correspond to one optical unit 3. As shown in FIG. 8, multiple light sources 1 correspond to one optical unit 3. According to switching requirements of light output direction of the light source 1, various optical elements 31 in one optical unit 3 can, respectively, directly face multiple light sources 1 corresponding thereto. For example, in a case there may be one optical unit 3 and multiple light sources L The foregoing cases of providing light source(s) 1 and optical unit(s) 3 can all realize changing the light output direction of the light source 1 in different modes.

The backlight source according to the present disclosure, by providing the light direction transformation part 7 at a light output side of the light source 1, can change the propagation direction of light emitted by the light source 1 in at least two different light direction transformation modes, so that the backlight direction of the backlight source can be changed in at least two modes, which in turn enables a display device employing the backlight source to realize switching between at least two display viewing angles, to meet the demands of viewers under different scenarios.

According to an embodiment of the present disclosure, there is provided a display panel, which includes the backlight source described in any one of the above embodiments.

By employing the above-described backlight source, the display panel can realize switching between at least two display viewing angles, to meet the demands of viewers under different scenarios.

According to an embodiment of the present disclosure, there is provided a display device, including the above-described display panel.

By employing the above-described display panel, the display device can realize switching between at least two display viewing angles, to meet the demands of viewers under different scenarios.

The display device provided by the present disclosure may be any product or component having a display function such as a LCD (Liquid Crystal Display) panel, a LCD television, a display, a mobile phone, a navigator and so on.

Figure 7:
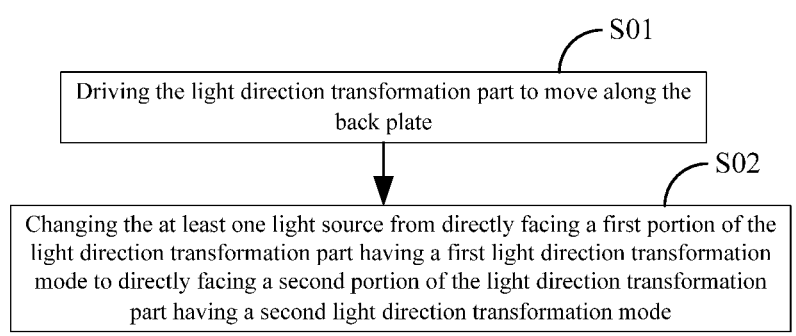
FIG. 7 is a flow chart of a method for controlling a light output direction of a backlight source according to an embodiment of the present disclosure.

According to an embodiment of the present disclosure, there is provided a method for controlling a light output direction of a backlight source, wherein the backlight source includes: a back plate 6; at least one light source 1, which is disposed on a surface of the back plate 6; and a light direction transformation part 7, which is attached to the back plate 6, and is located at a light output side of the at least one light source 1, the light direction transformation part 7 is movably attached to the back plate 6. As shown in FIG. 7, the method includes the following steps:

Step S01, driving the light direction transformation part 7 to move along the back plate 6.

Step S02, changing the at least one light source 1 from directly facing a first portion of the light direction transformation part 7 having a first light direction transformation mode to directly facing a second portion of the light direction transformation part 7 having a second light direction transformation mode.

According to an embodiment of the present disclosure, each of the first light direction transformation mode and the second light direction transformation mode is one of a mode for causing light convergence, a mode for causing light divergence, and a mode for causing light to travel along a specified direction, and the first light direction transformation mode is different from the second light direction transformation mode.

The different light direction transformation modes change the propagation direction of light emitted by the light source 1, so that the backlight direction of the backlight source can be changed in different modes, which in turn enables a display device employing the backlight source to realize switching between at least two display viewing angles, to meet the demands of viewers under different scenarios.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A backlight source, comprising:
a back plate;
a plurality of light sources arranged in an array, which are disposed on a surface of the back plate; and
a light direction transformation part, which is attached to the back plate, and is located at a light output side of the plurality of light sources, wherein the light direction transformation part is configured to be movable along the back plate, such that at least one light source of the plurality of light sources is changed from directly facing a first portion of the light direction transformation part having a first light direction transformation mode to directly facing a second portion of the light direction transformation part having a second light direction transformation mode, and the first light direction transformation mode is different from the second light direction transformation mode,
the light direction transformation part comprises a transparent base and a plurality of optical units arranged in an array and disposed on a surface of the transparent base distal to the at least one light source,
the plurality of light sources are arranged to be in one-to-one correspondence with the plurality of optical units,
each of the plurality of optical units comprises four optical elements, and the four optical elements are arranged in a 2×2 array, the four optical elements have different light direction transformation modes, and those optical elements disposed at a same position of respective ones of the optical units have a same light direction transformation mode, and
the light direction transformation part moves along the back plate, to change one of the plurality of light sources from directly facing one of the four optical elements to directly facing another one of the four optical elements.

2. The backlight source according to claim 1, further comprising a driving mechanism, which is fixed onto the back plate, and is configured to drive the light direction transformation part to move along the back plate.

3. The backlight source according to claim 2, wherein the driving mechanism comprises a mechanical telescopic rod, a first end of the mechanical telescopic rod is fixed onto the transparent base, and a second end of the mechanical telescopic rod is fixed onto the back plate.

4. The backlight source according to claim 3, wherein the driving mechanism further comprises a driver provided on the back plate, and the driver is connected to the second end of the mechanical telescopic rod, and is configured to drive the mechanical telescopic rod to move telescopically in a desired direction.

5. The backlight source according to claim 1, wherein the light direction transformation mode is selected from a group consisting of a mode for causing light convergence, a mode for causing light divergence, and a mode for causing light to travel in a specified direction.

6. The backlight source according to claim 5, wherein the optical element is selected from a group consisting of a light converging device, a light diverging device, and a device for causing light to travel along a specified direction.

7. The backlight source according to claim 6, wherein the light converging device comprises a convex lens, the light diverging device comprises a concave lens, and the device for causing light to travel along a specified direction comprises a compound-eye lens.

8. The backlight source according to claim 1, wherein the backlight source is a direct illumination type backlight source, and the plurality of light sources comprise an organic light emitting diode.

9. The backlight source according to claim 8, further comprising a diffusion plate, which is disposed at a side of the light direction transformation part distal to the plurality of light sources.

10. A display panel, comprising the backlight source according to claim 1.

11. A display device, comprising the display panel according to claim 10.

12. A method for controlling a light output direction of the backlight source of claim 1, comprising: driving the light direction transformation part to move along the back plate, to change the at least one light source of the plurality of light sources from directly facing a first portion of the light direction transformation part having a first light direction transformation mode to directly facing a second portion of the light direction transformation part having a second light direction transformation mode.

13. The method according to claim 12, wherein each of the first light direction transformation mode and the second light direction transformation mode is one of a mode for causing light convergence, a mode for causing light divergence, and a mode for causing light to travel along a specified direction, and the first light direction transformation mode is different from the second light direction transformation mode.

14. A backlight source, comprising:
a back plate;
a plurality of light sources arranged in an array, which are disposed on a surface of the back plate; and
a light direction transformation part, which is attached to the back plate, and is located at a light output side of the plurality of light sources, wherein the light direction transformation part is configured to be movable along the back plate, such that at least one light source of the plurality of light sources is changed from directly facing a first portion of the light direction transformation part having a first light direction transformation mode to directly facing a second portion of the light direction transformation part having a second light direction transformation mode, and the first light direction transformation mode is different from the second light direction transformation mode, the light direction transformation part comprises a transparent base and a plurality of optical units arranged in an array and disposed on a surface of the transparent base distal to the at least one light source, the number of the plurality of light sources is greater than the number of the plurality of optical units, and multiple light sources correspond to one optical unit, each of the plurality of optical units comprises four optical elements, and the four optical elements are arranged in a 2×2 array, the four optical elements have different light direction transformation modes, and those optical elements disposed at a same position of respective ones of the optical units have a same light direction transformation mode, and the light direction transformation part moves along the back plate, to change one of the plurality of light sources from directly facing one of the four optical elements to directly facing another one of the four optical elements.

15. A method for controlling a light output direction of the backlight source of claim 14, comprising: driving the light direction transformation part to move along the back plate, to change the at least one light source of the plurality of light sources from directly facing a first portion of the light direction transformation part having a first light direction transformation mode to directly facing a second portion of the light direction transformation part having a second light direction transformation mode.

16. The method according to claim 15, wherein each of the first light direction transformation mode and the second light direction transformation mode is one of a mode for causing light convergence, a mode for causing light divergence, and a mode for causing light to travel along a specified direction, and the first light direction transformation mode is different from the second light direction transformation mode.

* * * * *